United States Patent Office 2,986,554
Patented May 30, 1961

2,986,554

ACCELERATING VULCANIZATION WITH SCHIFF'S BASES OF THIAZOLESULFENAMIDES

John J. D'Amico, Charleston, W. Va., assignor to Monsanto Chemical Company, St. Louis, Mo., a corporation of Delaware No Drawing. Filed Feb. 8, 1960, Ser. No. 7,125

12 Claims. (Cl. 260—79.5)

The present invention relates to a process of accelerating vulcanization of rubber. More particularly, it relates to accelerating vulcanization with Schiff's bases of arylene thiazolesulfenamides.

It is an object of the present invention to accelerate the vulcanization of sulfur vulcanizable diene rubber whether natural or synthetic. A further object is to provide vulcanizable natural and synthetic rubber compositions which possess a high degree of processing safety. Still another object is to provide vulcanized natural and synthetic rubber compositions which possess desirable physical properties. Other objects will be apparent from the detailed description following.

Schiff's bases are commonly understood to mean condensation products of primary amines and aldehydes which contain the characteristic unsaturated group

and it is in that sense that the term is used herein. The unsaturated arylene thiazolesulfenamides employed in the practice of the present invention may be conveniently represented schematically by the formula

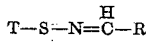

where T represents an arylene thiazole radical which radical may contain substituents in the arylene nucleus, as for example lower alkyl, halogen, preferably chlorine or bromine, nitro and lower alkoxy substituents.

represents the residue of an aldehyde above formaldehyde, as for example acetaldehyde, propionaldehyde, butyraldehyde, isobutyraldehyde, crotonaldehyde, 2-methyl-2-pentenal, 2-ethyl-2-hexenal, hexahydrobenzaldehyde, alphafurfuraldehyde, benzaldehyde, cinnamaldehyde, heptaldehyde, chloral, 2-thiophenaldehyde, 2,4-dichlorobenzaldehyde, 5-chlorosalicylaldehyde, o-chlorobenzaldehyde, 1-methyl-3-cyclohexenecarboxaldehyde and 3-cyclohexenecarboxaldehyde. It has been discovered that these Schiff's bases of arylenethiazolesulfenamides possess valuable delayed action accelerating properties.

Accelerators which may be cited to illustrate the invention comprise the following, although the invention is by no means limited thereto:

N-benzylidene-2-benzothiazolesulfenamide
N-benzylidene-2-(5-chlorobenzothiazole)sulfenamide
N-benzylidene-2-(4-methylbenzothiazole)sulfenamide
N-benzylidene-2-(6-ethoxybenzothiazole)sulfenamide
N-benzylidene-2-(4-phenylbenzothiazole)sulfenamide
N-benzylidene-2-(6-nitrobenzothiazole)sulfenamide
N-ortho-nitrobenzylidene-2-benzothiazolesulfenamide
N-meta-nitrobenzylidene-2-benzothiazolesulfenamide
N-para-nitrobenzylidene-2-benzothiazolesulfenamide
N-para-methoxybenzylidene-2-benzothiazolesulfenamide
N-(4-ethoxy-3-methoxybenzylidene) - 2 - benzothiazolesulfenamide
N-(2,3-dimethoxybenzylidene) - 2 - benzothiazolesulfenamide
N-[5-(1,3-benzodioxolyl)methylene] - 2 - benzothiazolesulfenamide
N-(3,4-dimethoxybenzylidene) - 2 - benzothiazolesulfenamide
N-cinnamylidene-2-benzothiazolesulfenamide
N-butylidene-2-benzothiazolesulfenamide
N-ethylidene-2-benzothiazolesulfenamide
N-isobutylidene-2-benzothiazolesulfenamide
N-ortho-chlorobenzylidene-2-benzothiazolesulfenamide
N-para-chlorobenzylidene-2-benzothiazolesulfenamide
N-(3,4-dichlorobenzylidene)-2-benzothiazolesulfenamide
N-(2,4 - dichlorobenzylidene) - 2 - benzothiazolesulfenamide.

Preparation of the accelerators, some of which are new compounds, is illustrated by the following examples.

Example 1

100 grams (0.548 mole) of 2-benzothiazolesulfenamide, 600 ml. of ethyl alcohol, 72 grams of potassium carbonate and 82 grams (0.548 mole) of meta-nitrobenzaldehyde were heated to a temperature of 70° C. in ten minutes and then held at 70–77° C. for 15 minutes. After cooling to 25° C. and adding 1500 grams of ice water to the reaction mixture it was stirred at 0–10° C. for one hour. The precipitate was collected by filtration, washed with water until neutral to litmus and air dried at 25–30° C. N-meta-nitrobenzylidene-2-benzothiazolesulfenamide was obtained in 91.2% yield as a yellow solid. It melted at 184–185° C. after recrystallization from benzene. Analysis gave 20.3% sulfur, the calculated value for $C_{14}H_9N_3O_2S_2$.

Employing substantially the same reaction conditions and replacing the meta-nitrobenzaldehyde with an equimolar amount, respectively, of 2,4-dichlorobenzaldehyde and p-chlorobenzaldehyde, further examples were prepared possessing the following physical properties:

Example 2

N-(2,4-dichlorobenzylidene) - 2 - benzothiazolesulfenamide, a cream solid, in 89.5% yield. After recrystallization from ethyl alcohol/benzene it melted at 147–148° C. Analysis gave 8.2% nitrogen, 18.8% sulfur and 20.1% chlorine as compared to 8.3% nitrogen, 18.9% sulfur and 20.9% chlorine calculated for $C_{14}H_8Cl_2N_2S_2$.

Example 3

N-(p-chlorobenzylidene) - 2 - benzothiazolesulfenamide, a cream solid, in 88.5% yield. After recrystallization from ethyl alcohol/benzene it melted at 157–158° C. Analysis gave 9.1% nitrogen, 21.0% sulfur and 11.5% chlorine as compared to 9.2% nitrogen, 21.0% sulfur and 11.6% chlorine calculated for $C_{14}H_9ClN_2S_2$.

Example 4

In similar manner N-ortho-chlorobenzylidene-2-benzothiazolesulfenamide was prepared by heating from 30 to 62° C. in ten minutes a charge consisting of 100 grams, (0.548 mole) of 2-benzothiazolesulfenamide, 78 grams (0.548 mole) of ortho-chlorobenzaldehyde, 400 ml. of ethyl alcohol and 72 grams of potassium carbonate. The reaction mixture was then heated at 73 to 79° C. for thirty minutes and isolated as described. The product was a cream solid obtained in 83.5% yield. After recrystallization from ethyl alcohol it melted at 108–109° C. Analysis gave 9.2% nitrogen, 21.0% sulfur and 11.7% chlorine as compared to 9.2% nitrogen, 21.0% sulfur and 11.6% chlorine calculated for $C_{14}H_9ClN_2S_2$.

Example 5

Substituting 105 grams (0.6 mole) of 3,4-dichlorobenzaldehyde for ortho-chlorobenzaldehyde and 55.4 grams of sodium carbonate for potassium carbonate in Example 4, the charge was heated at 70–75° C. for one hour. After cooling to 25° C., 500 ml. of water was added and the mixture stirred for fifteen minutes. The precipitate which formed was collected by filtration, washed with water until neutral to litmus and air dried at 25–30° C. N-(3,4-dichlorobenzylidene)-2-benzothiazolesulfenamide was obtained in 84.4% yield as a white solid melting at 178–180° C. after recrystallization from benzene. Analysis gave 8.3% nitrogen, 19.0% sulfur and 20.9% chlorine as compared to 8.3% nitrogen, 18.9% sulfur and 20.9% chlorine calculated for $C_{14}H_8Cl_2N_2S_2$.

Example 6

To prepare N-benzylidene-2-benzothiazolesulfenamide, 50 grams (0.274 mole) of 2-benzothiazolesulfenamide, 200 ml. of ethyl alcohol, 36 grams of potassium carbonate and 29.2 grams (0.274 mole) of benzaldehyde were heated at refluxing temperature for thirty minutes and then cooled to 25° C. To the cooled reaction mixture was added 200 ml. of water and after cooling to 5° C., the solids were removed by filtration, washed with water until neutral to litmus and air dried at 25–30° C. The melting point was 116–118° C. after recrystallization from ethyl alcohol.

Example 7

A charge consisting of 100 grams (0.548 mole) of 2-benzothiazolesulfenamide, 99 grams (0.548 mole) of 4-ethoxy-3-methoxybenzaldehyde, 400 ml. of ethyl alcohol and 72 grams of potassium carbonate was heated at refluxing temperature for two and one-half hours. After cooling to 25° C., 1000 grams of ice water were added and the reaction mixture stirred at 0–10° C. for one hour. The precipitate was collected by filtration, washed with water until neutral to litmus and air dried at 25–30° C. N-(4-ethoxy-3-methoxybenzylidene)-2-benzothiazolesulfenamide was obtained in 96.5% yield as a cream solid melting at 118–119° C. after recrystallization from ethyl alcohol. Analysis gave 8.1% nitrogen and 18.7% sulfur as compared to 8.1% nitrogen and 18.8% sulfur calculated for $C_{17}H_{16}N_2O_2S_2$.

Employing substantially the same reaction conditions and replacing the 4-ethoxy-3-methoxybenzaldehyde with an equi-molar amount, respectively, of 2,3-dimethoxybenzaldehyde and piperonal, further examples were prepared possessing the following physical properties:

Example 8

N-(2,3-dimethoxybenzylidene)-2-benzothiazolesulfenamide, a cream solid, in 96% yield. After recrystallization from ethyl alcohol it melted at 127–129° C. Analysis gave 8.5% nitrogen and 19.5% sulfur as compared to 8.5% nitrogen and 19.4% sulfur calculated for $C_{16}H_{14}N_2O_2S_2$.

Example 9

N-[5-(1,3-benzodioxolyl)methylene]-2-benzothiazolesulfenamide, a cream solid, in 97% yield. After recrystallization from ethyl acetate it melted at 165–166° C. Analysis gave 8.8% nitrogen and 20.6% sulfur as compared to 8.9% nitrogen and 20.4% sulfur calculated for $C_{15}H_{10}N_2O_2S_2$.

Example 10

Substituting 91 grams (0.548 mole) of 3,4-dimethoxybenzaldehyde for 4-ethoxy-3-methoxybenzaldehyde in Example 7, the charge was heated at refluxing temperature for one and one-half hours. Thereupon the mixture was cooled to 25° C. and 2000 grams of ice water added. Stirring was continued for three hours at 0–10° C. and isolated as described. The N-(3,4-dimethoxybenzylidene)-2-benzothiazolesulfenamide was a cream solid melting at 134–135° C. after recrystallization from ethyl alcohol. Analysis gave 8.4% nitrogen as compared to a calculated value of 8.5% for $C_{16}H_{14}N_2O_2S_2$.

The valuable properties of the new accelerators may be demonstrated by heating them with the rubber and sulfur in the manner well known to the art. Vulcanizable compositions were compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| 1,2-dihydro-6-dodecyl-2,2,4-trimethylquinoline | 1.5 |
| Sulfur | 2.5 |
| Accelerator | 0.5 |

Processing safety of the vulcanizable mixes was evaluated by means of a Mooney plastometer. The figures recorded were the times required for the Mooney plasticity at 135° C. to rise ten points above the minimum value.

| Stock | Accelerator | Mooney Scorch Time at 135° C. Time in minutes for 10 pt. rise above minimum |
|---|---|---|
| A | N-m-Nitrobenzylidene-2-benzothiolesulfenamide. | 9.2 |
| B | N-Benzylidene-2-benzothiazolesulfenamide. | 10.1 |
| C | N-m-Chlorobenzylidene-2-benzothiazolesulfenamide. | 9.6 |
| D | 2,2'-Dithiobisbenzothiazole (control). | 7.2 |

The compositions were vulcanized by heating for different periods of time in the usual manner in a press at 144° C. The modulus and tensile properties of the 30 minute cures are recorded below:

| Stock | Modulus of Elasticity in lbs./in.$^2$ at Elongation of 300% | Tensile at Break in lbs./in.$^2$ | Ultimate Elongation, Percent |
|---|---|---|---|
| A | 1,750 | 3,340 | 500 |
| B | 1,820 | 3,700 | 540 |
| C | 1,590 | 3,420 | 540 |
| D | 1,930 | 3,800 | 510 |

As a further embodiment of the invention stocks were compounded comprising:

| Stock | E | F | G | H |
|---|---|---|---|---|
| | Parts by weight | | | |
| Smoked sheets rubber | 100 | 100 | 100 | 100 |
| Carbon black | 50 | 50 | 50 | 50 |
| Zinc oxide | 5 | 5 | 5 | 5 |
| Stearic acid | 3 | 3 | 3 | 3 |
| Saturated hydrocarbon softener | 3 | 3 | 3 | 3 |
| Phenyl-beta-naphthylamine | 1 | 1 | 1 | 1 |
| Sulfur | 2.5 | 2.5 | 2.5 | 2.5 |
| N-(4-Ethoxy-3-methoxybenzylidene)-2-benzothiazolesulfenamide | 0.5 | | | |
| N-(2,3-Dimethoxybenzylidene)-2-benzothiazolesulfenamide | | 0.5 | | |
| N-[5-(1,3-Benzodioxolyl)methylene]-2-benzothiazolesulfenamide | | | 0.5 | |
| N-(3,4-Dimethoxybenzylidene)-2-benzothiazolesulfenamide | | | | 0.5 |

Again the processing safety of the stocks was evaluated by the Mooney plastometer:

| Stock | Mooney Scorch time at 135° C. Time in Minutes for 10 pt. rise above Minimum |
|---|---|
| E | 14.7 |
| F | 15.6 |
| G | 19.2 |
| H | 15.2 |

These data show that the compounds are very effective delayed action accelerators. Replacing the accelerator of the base stock by 0.5 part of a commercial delayed action accelerator resulted in a stock having a Mooney scorch time of 14.1 minutes.

The above stocks so compounded were cured in the usual manner by heating in a press at 144° C. The modulus and tensile properties of the 60 minute cures are recorded below:

| Stock | Modulus of Elasticity in lbs./in.² at Elongation of 300% | Tensile at Break in lbs./in.² | Ultimate Elongation, Percent |
|---|---|---|---|
| E | 2,030 | 3,760 | 500 |
| F | 2,050 | 3,750 | 500 |
| G | 1,720 | 3,240 | 500 |
| H | 1,950 | 3,390 | 470 |

The accelerating properties and processing safety in the following stock further illustrate the invention:

| | Parts by weight |
|---|---|
| Smoked sheets | 100.0 |
| Carbon black | 50.0 |
| Zinc oxide | 5.0 |
| Stearic acid | 3.0 |
| Saturated hydrocarbon softener | 3.0 |
| 1,2 - dihydro - 6 - dodecyl - 2,2,4 - trimethyl-quinoline | 1.5 |
| N-nitrosodiphenylamine | 1.0 |
| Sulfur | 2.5 |
| Accelerator | 0.5 |

Employing as a control N-cyclohexyl-2-benzothiazolesulfenamide, processing safety determined as described above gave results as follows:

| Stock | Accelerator | Mooney Scorch time at 135° C. Time in Minutes for 10 pt. rise above minimum |
|---|---|---|
| J | N-m-Nitrobenzylidene-2-benzothiazolesulfenamide | 14.6 |
| K | N-Cyclohexyl-2-benzothiazolesulfenamide | 14.0 |

The compositions were vulcanized by heating for different periods of time in the usual manner in a press at 144° C. The modulus and tensile properties of the 30 minute cures are recorded below:

| Stock | Modulus of Elasticity in lbs./in.² at Elongation of 300% | Tensile at Break in lbs./in.² | Ultimate Elongation, Percent |
|---|---|---|---|
| J | 1,710 | 3,540 | 560 |
| K | 2,050 | 3,940 | 520 |

Similar tests were carried out with stocks comprising:

| Stock | L | M | N | O | P |
|---|---|---|---|---|---|
| | Parts by weight | | | | |
| Smoked sheets | 100 | 100 | 100 | 100 | 100 |
| Carbon black | 50 | 50 | 50 | 50 | 50 |
| Zinc oxide | 5 | 5 | 5 | 5 | 5 |
| Stearic acid | 3 | 3 | 3 | 3 | 3 |
| Saturated hydrocarbon softener | 3 | 3 | 3 | 3 | 3 |
| Phenyl-beta-naphthylamine | 1 | 1 | 1 | 1 | 1 |
| Sulfur | 2.5 | 2.5 | 2.5 | 2.5 | 2.5 |
| N-Nitrosodiphenylamine | 1 | 1 | 1 | 1 | 1 |
| N-(4-Ethoxy-3-methoxybenzylidene)-2-benzothiazolesulfenamide | 0.72 | | | | |
| N-(2,3-Dimethoxybenzylidene)-2-benzothiazolesulfenamide | | 0.7 | | | |
| N-(p-Chlorobenzylidene)-2-benzothiazolesulfenamide | | | 0.64 | | |
| N-[5-(1,3-Benzodioxolyl)methyl]-2-benzothiazolesulfenamide | | | | 0.66 | |
| N-(3,4-Dichlorobenzylidene)-2-benzothiazolesulfenamide | | | | | 0.71 |

Vulcanization was completed in 60 minutes at a temperature of 144° C. and the following results were obtained on the stocks:

| Stock | Modulus of Elasticity in lbs./in.² at Elongation of 300% | Tensile at Break in lbs./in.² | Mooney Scorch Time |
|---|---|---|---|
| L | 2,140 | 3,750 | 32.1 |
| M | 2,080 | 3,600 | 35.1 |
| N | 2,090 | 3,900 | 33.2 |
| O | 2,190 | 4,000 | 28.9 |
| P | 2,140 | 3,740 | 31.2 |

These data, from stocks containing the accelerators in molecularly equivalent amounts, again demonstrate the high processing safety of the accelerators. Mooney scorch time in the same base stock containing 0.5 part of the same commercial delayed action accelerator referred to above was 21.3 minutes.

Although the invention has been illustrated by numerous specific embodiments, it is not limited thereto. The principles described may be employed to advantage for compounding other types of sulfur vulcanizable diene rubbers. These rubbers contain a diene hydrocarbon in the polymer structure which contributes unsaturation and sulfur vulcanizability. They include synthetic polyisoprene, polymers of butadiene-1,3 and copolymers of butadiene-1,3 with vinyl monomers copolymerizable therewith, such as styrene and acrylonitrile.

Smaller amounts of the accelerators may be employed than those indicated in the examples. Amounts as small as 0.1% by weight on the rubber as well as amounts higher than those specifically shown, as for example up to 5% by weight on the rubber, may be employed depending upon the nature of the rubber, the other compounding ingredients used and the objectives of the compounder.

It is intended to cover all changes and modifications of the examples of the invention herein chosen for purposes of disclosure which do not constitute departures from the spirit and scope of the invention.

This application is a continuation-in-part of application Serial No. 709,210, filed January 16, 1958, now abandoned.

What is claimed is:

1. The process of vulcanizing a sulfur vulcanizable diene rubber which comprises heating the rubber and sulfur in the presence of a small amount sufficient to accelerate vulcanization of a compound of the structure

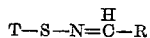

$$T-S-N=\overset{H}{C}-R$$

where T represents 2-benzothiazolyl and R represents lower dialkoxy substituted phenyl.

2. The process of vulcanizing a sulfur vulcanizable diene rubber which comprises heating the rubber and sulfur in the presence of a small amount sufficient to accelerate vulcanization of N-(2,3-dimethoxybenzylidene)-2-benzothiazolesulfenamide.

3. The process of vulcanizing a sulfur vulcanizable diene rubber which comprises heating the rubber and sulfur in the presence of a small amount sufficient to accelerate vulcanization of a compound of the structure

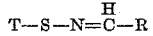

where T represents a 2-phenylenethiazolyl radical in which the phenylene radical is selected from the group consisting of unsubstituted phenylene, hydrocarbon substituted phenylene containing less than thirteen carbon atoms, halogen substituted phenylene, lower alkoxy substituted phenylene, and nitro substituted phenylene and R represents an organic radical selected from the group consisting of alkyl, alkenyl, cyclohexyl, cyclohexenyl, halogen substituted alkyl, phenyl, halogen substituted phenyl, halogen substituted hydroxyphenyl, nitro substituted phenyl, phenyl substituted alkenyl, furyl, thienyl and lower alkoxy substituted phenyl.

4. The process of vulcanizing a sulfur vulcanizable diene rubber which comprises heating the rubber and sulfur in the presence of a small amount sufficient to accelerate vulcanization of a compound of the structure

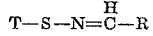

where T represents 2-benzothiazolyl and

represents the residue of an aldehyde, R being an alkenyl radical.

5. The process of vulcanizing a sulfur vulcanizable diene rubber which comprises heating the rubber and sulfur in the presence of a small amount sufficient to accelerate vulcanization of a compound of the structure

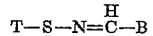

where T represents 2-benzothiazolyl and B represents an aryl radical of the benzene series containing 6 carbon atoms.

6. The process of vulcanizing a sulfur vulcanizable diene rubber which comprises heating the rubber and sulfur in the presence of a small amount sufficient to accelerate vulcanization of a compound of the structure

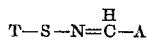

where T represents 2-benzothiazolyl and A represents an alicyclic radical containing 6 ring carbon atoms.

7. The process of vulcanizing a sulfur vulcanizable diene rubber which comprises heating the rubber and sulfur in the presence of a small amount sufficient to accelerate vulcanization of a compound of the structure

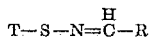

where T represents 2-benzothiazolyl and R represents an alkyl radical of 1-12 carbon atoms.

8. The process of vulcanizing a sulfur vulcanizable diene rubber which comprises heating the rubber and sulfur in the presence of a small amount sufficient to accelerate vulcanization of a compound of the structure

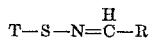

where T represents 2-benzothiazolyl and R represents furyl.

9. The process of vulcanizing a sulfur vulcanizable diene rubber which comprises heating the rubber and sulfur in the presence of a small amount sufficient to accelerate vulcanization of N-benzylidene-2-benzothiazolesulfenamide.

10. The vulcanized product prepared by the process of claim 3.

11. The vulcanized product prepared by the process of claim 9.

12. The process of vulcanizing a sulfur vulcanizable diene rubber which comprises heating the rubber and sulfur in the presence of a small amount sufficient to accelerate vulcanization of a compound of the structure

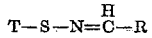

where T represents 2-benzothiazolyl and R represents lower alkoxy substituted phenyl.

No references cited.